United States Patent [19]

Seebo et al.

[11] Patent Number: 5,354,394
[45] Date of Patent: Oct. 11, 1994

[54] APPARATUS AND METHOD FOR FORMING HONEYCOMB CORE

[75] Inventors: H. Freeman Seebo, Tacoma; Robert E. Holeton, Redmond, both of Wash.

[73] Assignee: Seeton Technologies, Auburn, Wash.

[21] Appl. No.: 20,624

[22] Filed: Feb. 22, 1993

Related U.S. Application Data

[63] Continuation-in-part of Ser. No. 974,247, Nov. 10, 1992.

[51] Int. Cl.5 .................. B32B 31/02; B32B 31/12; B32B 31/20; B29C 33/02
[52] U.S. Cl. .................. 156/358; 156/155; 156/251; 156/252; 156/292; 156/359; 156/443; 156/500; 156/513; 264/317; 428/118
[58] Field of Search .............. 156/155, 292, 513, 443, 156/500, 252, 358–359, 251; 428/116, 118, 593; 219/78.11, 78.12; 249/142; 425/468, DIG. 10; 264/317

[56] References Cited

U.S. PATENT DOCUMENTS

| | | | |
|---|---|---|---|
| 2,454,719 | 11/1948 | Scogland | 156/155 |
| 2,523,525 | 9/1950 | Sachs | 156/443 X |
| 2,609,068 | 9/1992 | Pajak | 156/252 X |
| 2,734,843 | 2/1956 | Steele | 156/252 X |
| 3,021,241 | 2/1962 | Schneiderman et al. | 264/317 X |
| 3,391,511 | 7/1968 | Harris et al. | |
| 3,806,928 | 4/1974 | Costanza | |
| 3,991,245 | 11/1976 | Jackson | |
| 4,090,002 | 5/1978 | Rosenblum | |
| 4,300,978 | 11/1981 | Whitemore et al. | |
| 4,822,660 | 4/1989 | Lipp | |
| 5,126,000 | 6/1992 | Takai et al. | |
| 5,139,596 | 8/1992 | Fell | |

FOREIGN PATENT DOCUMENTS

| | | | |
|---|---|---|---|
| 56-84912 | 7/1981 | Japan | 264/317 |
| 59-85741 | 5/1984 | Japan | 428/116 |
| 1375855 | 11/1974 | United Kingdom | 264/317 |
| 2090183 | 7/1982 | United Kingdom | 264/317 |

OTHER PUBLICATIONS

PCT publication WO87/06186, Oct. 22, 1987, Ashton, 428/118.

Primary Examiner—Michael W. Ball
Assistant Examiner—Adrienne C. Johnstone
Attorney, Agent, or Firm—Seed and Berry

[57] ABSTRACT

There is disclosed an apparatus and method for forming a honeycomb core. In particular, the apparatus comprises a compressible array of heater rods that are interleaved with layers of a formable material. Upon compressing the array, the formable material conforms to the shape of the heater rods. Through the application of heat and pressure, the different layers of the formable material are caused to bind to each other. The bound layers thereby form a honeycomb core, which is then removed from the forming apparatus. Also disclosed herein are methods of making honeycomb core using the apparatus, as well as methods of determining precise curing conditions for the making of honeycomb core, by sensing the temperature and pressure transmitted to the formable materials during the curing process.

9 Claims, 4 Drawing Sheets

APPARATUS AND METHOD FOR FORMING HONEYCOMB CORE

RELATED APPLICATION

This application is a continuation-in-part of co-pending application Ser. No. 07/974,247, filed Nov. 10, 1992.

TECHNICAL FIELD

The field of the present invention is honeycomb core, and more particularly, a method and apparatus for the forming of honeycomb core.

BACKGROUND OF THE INVENTION

Prior methods of making honeycomb core include laying a series of glue lines of a specific width and spacing on a sheet of desired substrate, to give a pre-glued sheet. The pre-glued sheets are then stacked with the glue lines offset from one sheet to another. The glue is activated under pressure and then the bonded stack is expanded or stretched to form the honeycomb. Typically, the expanded honeycomb block is then dipped one or more times to impregnate and/or coat the substrate with any of a variety of coating materials, such as a phenolic resin.

In an alternative version of this technique, corrugated material is used as the preferred substrate, with the glue lines applied to the high side of the waves of the corrugated sheet. The pre-glued corrugated sheets are staggered and the glue activated. The corrugated product is then dipped or coated as desired.

In another method, as described in U.S. Pat. No. 5,139,596, a honeycomb core is made one layer at a time. The honeycomb core is made by repeatedly passing an appropriately shaped roller, and forcing heated air, over a chosen substrate that is placed over a group of rods shaped to complement the roller. Upon passing the roller over the complementary-shaped rods, the roller and heated air cause the material to take the shape of the rods and the roller. Repeatedly passing the roller over new layers of rods and substrate forms the core one layer at a time.

These methods do not, however, provide for the formation of a full block of honeycomb core having well-defined cells in a single step while carefully controlling heat and pressure applied to the core. Further, these methods do not provide for the formation of a honeycomb core without using heated air or dipping, which can cause the release of noxious, and potentially toxic, fumes into the air, thereby creating a hazard for workers and pollution harmful to the environment.

SUMMARY OF THE INVENTION

The present invention is directed to an apparatus and method suitable for forming a honeycomb core. A honeycomb core, according to the present invention, comprises two or more layers of a formable material wherein adjacent layers of the material are bound to each other in certain locations such that the unbound portions of adjacent layers form cells. The cells produced by the present invention are uniformly consistent. Moreover, they are not stretched, broken or collapsed as often occurs from making honeycomb core by stretching a bonded stack of pre-glued sheets.

In comparison to prior methods of forming honeycomb core, the method of the present invention allows decreased cure and cycle times, and permits the use of more precise and well-regulated temperatures and pressures. Further, the present invention decreases the release of pollutants due to the decreased cure times and also due to the elimination of dipping during the forming of the honeycomb core and the requirement for heated air to heat the honeycomb core. The decrease in emissions also results in an increase in worker safety, as the workers are not exposed to potentially hazardous curing chemicals.

In one aspect, the present invention provides an apparatus for forming honeycomb core. The apparatus comprises a compressible array of three or more levels of generally parallel heater rods. The heater rods are able to controllably generate and transmit heat, such as through the passage of electricity through the heater rods. The heat is transmitted to two or more layers of a formable material that have been interleaved between the heater rods prior to the compression of the array of heater rods. Preferably, the layers of formable material are interleaved in alternating fashion between the levels of heater rods.

The heater rods are able to actively transmit heat to the formable material along the length of the heater rods. Accordingly, the transmitted heat is uniform throughout the core during curing, as opposed to heat that would be supplied by an external source, such as an oven, which would heat the outside first. Yet, no heated air or liquid need contact the materials forming the honeycomb core, although heated air, steam or liquid could be passed through the heater rods to generate heat in the heater rods, preferably in a closed system. In part because the heater rods provide heat, as opposed to an outside source, the compressible array may be enlarged or reduced, or lengthened or shortened, without regard to external constraints such as the size of the outside heat source.

The heater rods may be permanently or releasably attached at a first end to the heat source (such as an electrical source). The heater rods are releasably attached at a second end to a connector, such as a steel connector, able to maintain the desired spatial relation of the heater rods during forming, and even further preferably able to transmit electricity. In a preferred embodiment, one end of the rods is permanently attached to a source of heat and/or pressure.

The compressible array is able to provide pressure to the formable material interleaved in the array. In a preferred embodiment, the array is maintained between the plates of a press to provide such pressure. Further preferably, the plates are shaped to conform to the shape of the heater rods in the compressible array. The press is preferably mechanically, pneumatically or hydraulically powered. Alternatively, the pressure may be generated by other means, such as by pressing one or both of the ends of the heater rods together. When a press is used, there may be only one or two levels of heater rods, with two or three layers of formable material interleaved between the heater rods and the plates of the press. In such an embodiment, the sides of the press perform the same function as, and are equivalent to, levels of heater rods, and are included within the definition of levels of heater rods for the purposes of the present invention.

In preferred embodiments, the heater rods have a non-binding, non-reactive surface such as a coating of TEFLON ® or glass. Further, the heater rods preferably have a geometric shape in cross section such as a hexagon, such that one heater rod is able to lie substantially flush with its adjacent rods. The heater rods are typically of a single circumference and cross-sectional shape from one end to the other, but they may be tapered or have a changed cross-sectional shape. By using non-uniform rods, the compressible array may be shaped and arranged so as to form a non-linear honeycomb core, such as a honeycomb core having a radius.

In an alternative embodiment, the heater rods are made of a meltable rod material that has a melting point higher than the forming point of the formable material that is used on the apparatus. The term "forming point," as used herein, means the temperature and pressure at which the shape of the honeycomb core is attained from the given formable materials. The meltable rod material has a melting point lower than the melting point of the formable materials once the formable materials have been formed.

By the use of such meltable heater rods, one may interleave layers of formable material between the heater rods of the array, then controllably generate and transmit heat through the heater rods to the formable material, thereby forming the formable materials into the shape of the honeycomb core. Next, the heat generated and transmitted by the heater rods is increased stepwise such that the heater rods melt, thereby allowing removal of the heater rods by merely "pouring out" the melted rod material, leaving a formed honeycomb core.

In a further alternative embodiment, the meltable rod material does not constitute the entire rod, but rather comprises an outer layer on a non-meltable heater rod core material. In this embodiment, a stepped temperature increase is used as with an entirely meltable heater rod and the extraction of the heater rods is facilitated by the decreased diameter of the heater rods upon the melting of the outer layer. The heater rods can then be regenerated by adding a new outer layer. Further, the shape of the heater rods may be altered from one use to the next by employing a shaped mold to generate the outer layer of the heater rods.

In a preferred embodiment, the meltable rod material comprises a desirable coating for the formed honeycomb core. Such a meltable rod material comprising a desirable coating provides a coated honeycomb core without the necessity for dipping, thereby reducing the production of noxious gases, as well as saving time, labor and resources.

In a further aspect of this embodiment, the meltable rod material has numerous projections extending from the outer surface. By the use of appropriately sized projections, the compressible array is able to perforate the formable material that is formed upon the apparatus, to yield a perforated honeycomb core. Perforated means the honeycomb core has spaces such that a gas or liquid can traverse the honeycomb core transverse to the cells of the honeycomb core.

The heater rods are able to attain heat sufficient to cause interaction between the adjacent layers of material to bind the layers. Such temperatures generally are greater than about 110° F., and typically are greater than about 350° F. In a preferred embodiment, the temperatures are between about 450° F. to about 550° F. Traditional methods of manufacturing honeycomb core typically use temperatures about 350° F., although temperatures approaching 450° F. have been used with certain materials such as non-metallic composites. Greater or lesser temperatures will be preferred depending on factors such as the type of formable material and the pressure. The ranges of heat and pressure transmitted to the formable materials by the apparatus of the present invention may vary widely, as shown above, from just above ambient temperature to about 1000° F. or more. The pressure may vary from just above the force of gravity to about 300 tons or more.

The heater rods of the array are preferably able to control the temperature within the array to within about 5° F., and even more preferably to within about 0.5° F., and can preferably control pressure to within about 1 lb/in$^2$. An even further preferred embodiment comprises computer control of the heater rods, thereby allowing better control of the temperature and/or pressure. Use of a computer also allows variance of heat and/or pressure from one end of a heater rod to the other, or from one heater rod to another.

In a further aspect, the invention provides a method of forming honeycomb core wherein two or more layers of a formable material are interleaved between three or more levels of heater rods and then compressed. Heat is then transmitted through the heater rods to cause the formable layers to conform to the shape of the heater rods and/or to cause each layer to bind to its adjacent layer(s). Next, the formed honeycomb core is removed from the heater rods.

In one embodiment, the apparatus for forming honeycomb core comprises heater rods comprising a meltable rod material. Accordingly, the removal of the heater rods from the formed honeycomb core is performed by raising the temperature generated and transmitted by the heater rods. In such a method, after the heater rods have generated and transmitted sufficient heat and/or pressure to the formable layers to cause the layers to bind to their adjacent layers (resulting in a formed honeycomb core), the temperature generated and transmitted by the heater rods is raised to the point that the meltable rod material melts.

In an embodiment where the meltable rod material comprises effectively all of the heater rod, the melted rod material is poured off, or otherwise removed, from the formed honeycomb core. In the embodiment where the non-meltable rod material comprises substantially all of each of the heater rods with each of the heater rods including the surface layer of meltable rod material, then the formed honeycomb core is removed from the heater rods by extracting the heater rods. In such a case, the extraction may be more easily performed than without such a meltable surface layer, due to a reduced diameter of the heater rods upon melting the outer surface.

A feature of using meltable heater rods, where the meltable rod material comprises a desirable coating material, is that the honeycomb core may be coated with the desirable coating material.

In a further embodiment of these embodiments of the invention wherein the heater rods comprise a meltable material, the heater rods have projections that, upon compression, pierce the formable material. Accordingly, a perforated, formed honeycomb core is created. In order to remove the heater rods, the temperature is raised to melt the meltable heater rod material as described above. Upon melting, the perforations in the formed honeycomb core are freed of heater rod material.

It is a feature of the method of the present invention that the heater rods are controllably able to attain very high temperatures during the forming of the honeycomb core. By the use of such very high temperatures, honeycomb core having very high operating temperatures can be produced. "Operating temperature" means the temperature to which the formed honeycomb core can be subjected during use in an operation, such as where the high-temperature formed honeycomb core is used in a jet engine for an aircraft. This feature of the invention is particularly advantageous for use with formable materials comprising one or more non-metallic composites, such as carbon fiber materials, graphite fiber materials, and ceramic fiber materials such as NEXTEL ® brand AF 10 ceramic fiber fabric (available from 3M Corporation).

Such materials comprising non-metallic composites have heretofore not been produced as a honeycomb core due to limitations relating to traditional honeycomb core methods and apparatus. However, such composite materials can be formed (and, if needed, secondarily cured) using the method and apparatus of the present invention at temperatures at or greater than 450° F., which is the highest temperature traditionally used for forming honeycomb core. In preferred embodiments, the surface temperature of the heater rods, and therefore the temperature imparted to the formable materials, is greater than about 600° F., preferably greater than about 800° F., and even further preferably greater than about 1000° F.

By the use of such heightened forming temperatures, high-temperature honeycomb cores having operating temperatures greater than about 550° F. can be produced, which is above the highest operating temperature traditionally obtained for honeycomb cores other than those consisting of metallic composite materials. Preferably, the formed high-temperature honeycomb core also has a high tensile strength, and is suitable for use at operating temperatures greater than about 700° F., further preferably greater than about 1000° F. or about 1500° F., and even further preferably greater than operating temperatures exceeding about 2000° F. or about 2200° F.

In preferred embodiments, the heater rods and/or materials are selected so that the honeycomb core is formed to have a radius or to have a varying sheer strength. Such attributes can be produced by using differing formable materials or differing heater rod shapes. The honeycomb core may also be formed to bend, due to selected differences in rod shape or formable material. Such differences may be selected to cause a portion of the honeycomb core to maintain its shape when removed from the array, while causing another portion to contract or expand, thereby producing a bending or folding effect. Accordingly, it is an advantage of the present invention that the arrangement of the heater rods in the array, and/or the shape of the heater rods, can be selectively varied to greatly influence numerous mechanical and other properties of the formed honeycomb core. Selection of appropriate arrangements and shapes to achieve desired mechanical and other properties in the honeycomb core will be apparent to a person having ordinary skill in the art.

The honeycomb core formed by the methods of the present invention comprises at least one formable material that is heat- and/or pressure-activated to bond to an adjacent layer of formable material. The formable material will also substantially maintain the shape of the heater rods used in forming the honeycomb core after the honeycomb core is removed from the heater rods. It is a feature of the present invention that the honeycomb core need not be subjected to stretching, dipping, or other procedures that tend to distort the cells of the honeycomb core.

Suitable honeycomb core materials, in addition to the high-temperature materials discussed above, include prepreg, thermoplastic, thermoset, fiberglass, aramid fiber such as NOMEX ® and sheet material such as aluminum or titanium foil, striped with heat or pressure-activated glue. By using sheets of different formable materials from sheet to sheet in a layer, and/or by arranging the sheets' warp, woof or fiber direction (if any) in differing directions from sheet to sheet in a layer, new materials may be created where such differing and/or arranged sheets contact each other.

In preferred embodiments, the sheets of formable material are selected to yield a formed honeycomb core of improved strength or flexibility, and the warp, woof or fiber direction are varied from one sheet of material to the next at any angle, for example, 30°, 45° or 90°.

In yet another aspect, the present invention provides a method of forming perforated honeycomb core. The present invention is advantageous for use with perforated honeycomb core comprising thermoplastic, thermoset, prepreg, fiberglass or an aramid fiber because dipping of such material is eliminated, thereby allowing the perforations to remain open upon forming the honeycomb core. The perforated honeycomb core can be made either employing pre-perforated formable material, or by employing heater rods comprising meltable rod material that have appropriately sized projections able to perforate the formable material upon compression of the array.

By use of such a perforated embodiment, the honeycomb core becomes permeable, and preferably selectively permeable or semi-permeable, to gases, liquids and matter borne by such gases or liquids.

Further, by the use of an appropriately sized honeycomb core produced using very thin heater rods and finely perforated formable materials, it is possible to produce a permeable honeycomb core suitable for use in a column or other apparatus for the separation of biological materials from a solution. The honeycomb core acts either by filtration or by binding desired materials. This embodiment advantageously provides a solid substrate that maintains its original conformation upon its removal from the column, thereby promoting localization of the selected biological matter. Further, the selected matter may be easily removed from the solid substrate by turning the honeycomb core on end and flushing the biological matter through the cells into a receiving receptacle.

In still a further aspect, the present invention provides a method of using the array for determining precise forming times for honeycomb core. In this aspect, layers of formable material are interleaved on levels of heater rods, as described above, then heat and pressure are transmitted through the heater rods to the honeycomb core, then the heat and pressure actually transmitted by the heater rods are sensed by a sensor located within the heater rods. Then, the honeycomb core is removed for inspection to determine whether the honeycomb core formed is better than other, previously formed honeycomb cores that used different cure times, temperatures and/or pressures.

In yet another aspect, the present invention provides a honeycomb core formed on the apparatus and the method described herein.

These and other aspects of the present invention will become evident upon reference to the following detailed description and attached drawings.

DETAILED DESCRIPTION OF THE INVENTION

Figure 1:
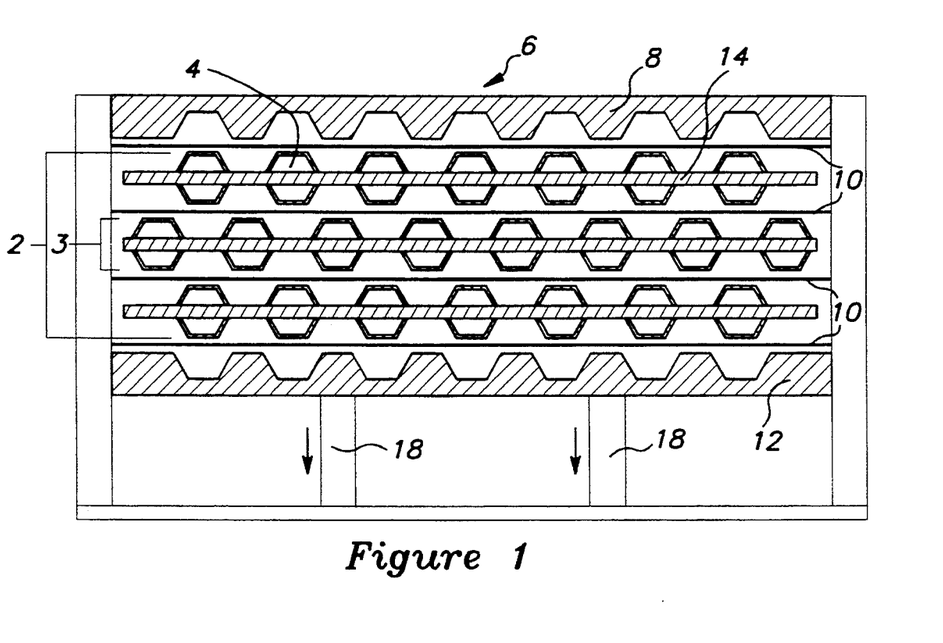
FIG. 1 depicts a side view of a compressible array of heater rods arranged according to the present invention, with layers of formable material interleaved between each of the levels of the heater rods, and wherein the heater rods are maintained between the upper and lower plates of a press.

FIG. 1 depicts a preferred embodiment wherein a compressible array 2 of heater rods 4 is maintained between an upper plate 8 and lower plate 12 of a press 6. The heater rods 4 are maintained in levels 3 and are interleaved with at least one selected formable material 10. The ends of the heater rods 4 are attached to a removable connector 14, which in the embodiment shown connects all of the heater rods in a given level 3. In a preferred embodiment, as depicted in both FIGS. 1 and 2, heater rods 4 have a hexagonal shape in cross section, but they may also have more than one shape in cross section. The heater rods may be of any suitable diameter, but are preferably between about ⅛" to about 5/16". The heater rods 4 are preferably coated with or made of a non-reactive and non-binding surface such as TEFLON ® or glass. Hydraulic, mechanical or pneumatic pressure is supplied via one or more moveable columns 18.

Figure 2:
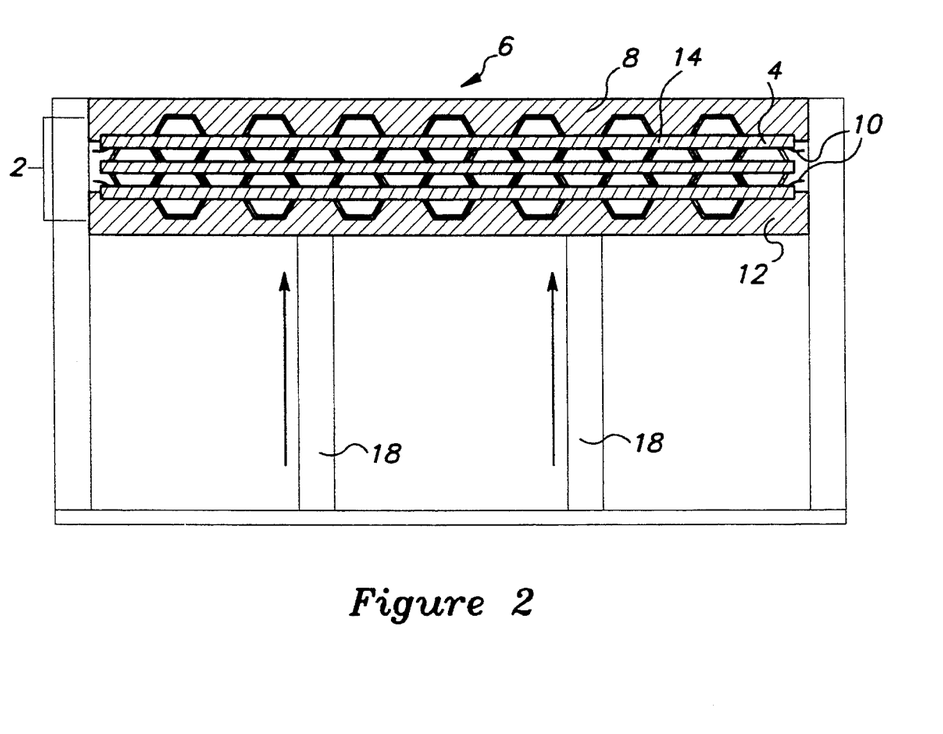
FIG. 2 depicts a side view of the compressible array of FIG. 1 in a compressed state.

FIG. 2 depicts the compressible array 2 of FIG. 1 upon compression of the compressible array due to pressure applied by upper plate 8 and lower plate 12. As can be seen, the heater rods 4 in the compressible array 2 compress toward each other, thereby causing the interleaved layers 10 of material to conform to the shape of the heater rods 4. Removable connector 14 may either supply electricity to the rods or conduct electricity from the rods if the rods are supplied with electricity from the other end. Further, removable connector 14 helps maintain heater rods 4 in their desired position, both when the compressible array 2 is compressed, as in FIG. 2, and when the compressible array 2 is not compressed, as in FIG. 1.

Upon compression of the compressible array 2, as depicted in FIG. 2, electricity, or another source of heat, is supplied to the rods, thereby generating heat along the length of the rods. This heat, independently or coupled with the pressure of press 6, causes the layers 10 of formable material to bind to each other and to substantially conform to the shape of the rods. In a preferred embodiment, the formable material is a prepreg. In another preferred embodiment, the formable material comprises a non-metallic composite, and preferably consists essentially of a non-metallic composite, such as a composite comprising one or more of carbon fibers, graphite fibers or ceramic fibers. In alternative preferred embodiments, the formable material is a thermoplastic, such that upon compression of the array and the application of heat, the material melts slightly at the conjunction of adjacent layers, creating a weld between adjacent layers. Alternatively, the formable material, such as aluminum foil, titanium foil or other metallic foils, has been treated with glue such that upon compression of the array and application of heat, the glue is activated and the layers are bound to each other. In further alternative embodiments, the material may be selected or treated such that only heat or pressure causes the binding.

Figure 3:
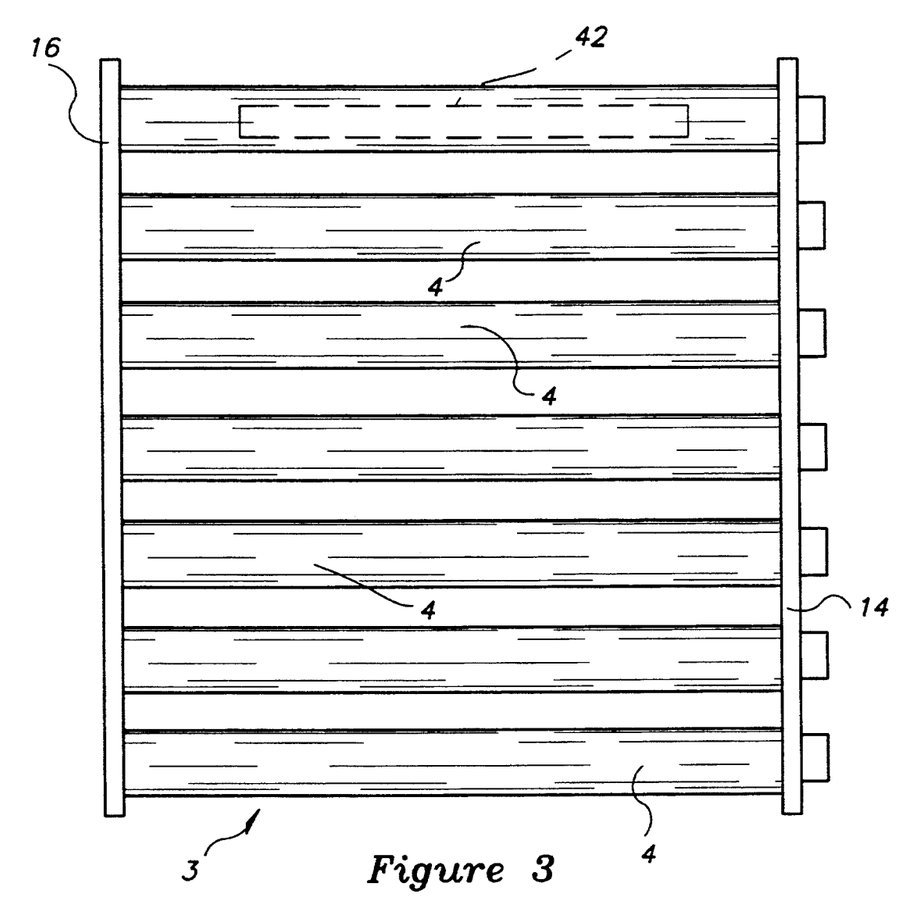
FIG. 3 depicts a plan view of a level of heater rods permanently attached at a first end to a source of heat and pressure, and removably attached at a second end to a rigid connector able to transmit electricity.

FIG. 3 is a plan view depicting a single level 3 of heater rods 4 in a preferred embodiment, wherein one end of the heater rods is permanently attached to a permanently affixed connector 16, while a second end of the heater rods is removably attached to the removable connector 14. Further, a temperature and pressure sensor 42 is located within one or more of the heater rods 12, in order to measure the temperature and pressure transmitted to the formable material.

Figure 4:
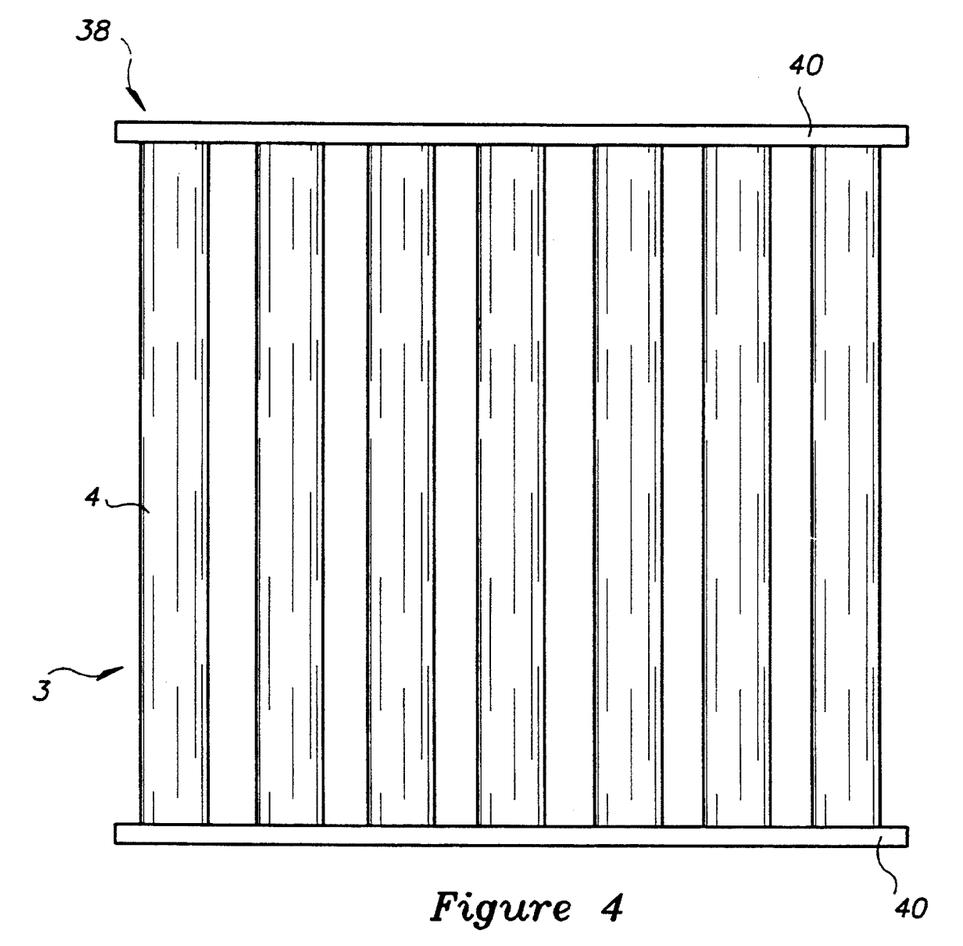
FIG. 4 depicts a plan view of a compressible array wherein a level of heater rods are maintained in a rack, which rack is interleaved between layers of a formable material placed into a press, and connected to a heat source.

FIG. 4 depicts an embodiment of the present invention wherein a level 3 of heater rods 4 is maintained as a rack 38. The rack 38 is then placed in a press and interleaved with selected formable material, and one or both rack ends 40 are connected to a heat and/or pressure source. The rack ends may both be removable connectors, or one may be a permanently attached connector and the other removably attached, or both may be permanently attached to the heater rods, in which case the heater rods themselves are separatable into more than one part, so that the core may be removed from the compressible array.

Figure 5:
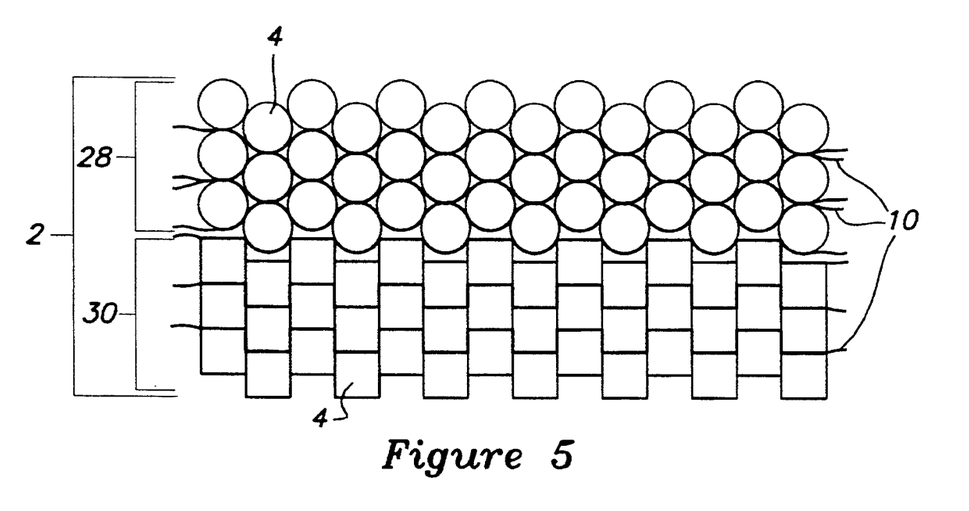
FIG. 5 depicts a side view of a compressible array wherein the heater rods have a first cross-sectional shape at one level and a second cross-sectional shape at another level.

FIG. 5 depicts an embodiment of the present invention wherein compressible array 2 comprises heater rods 4 having different shapes in cross section. For example, as depicted in FIG. 4, an upper portion 28 of compressible array 2 may have heater rods 4 of circular cross section, while a lower portion 30 of compressible array 2 may have heater rods 4 of square cross section. Use of alternative cross-sectional heater rod shapes allows for creation of honeycomb core having a differential sheer strength, due to differences in the cell shape at different levels of the honeycomb core. Further, use of differential honeycomb shapes may provide desirable mechanical properties.

Figures 6, 9:
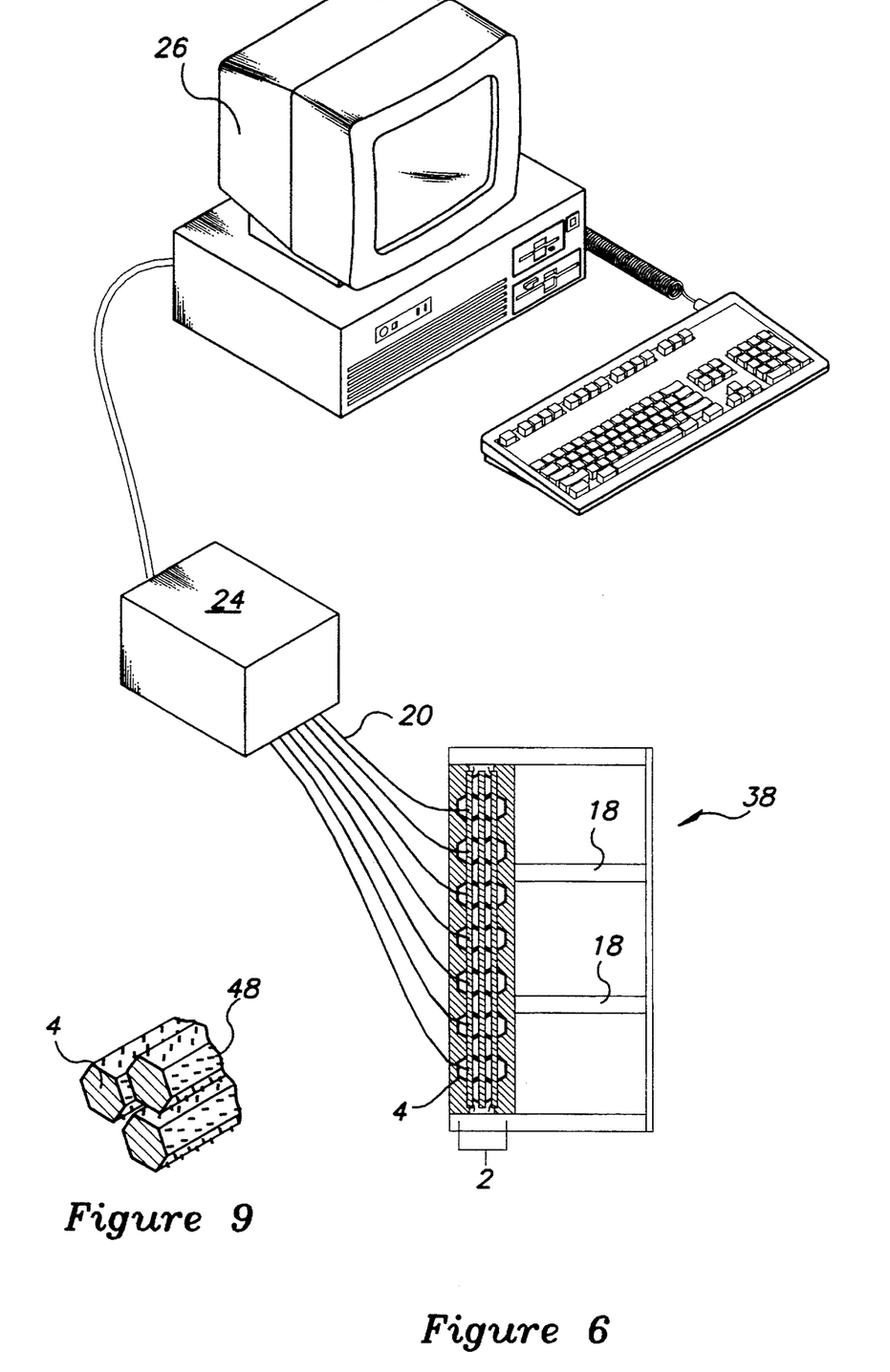
FIG. 6 depicts a perspective view of an alternative embodiment of the invention wherein each of the heater rods is controlled by a computer.
FIG. 9 depicts a perspective view of a portion of an array of meltable heater rods having projections.

FIG. 6 depicts an embodiment of the present invention wherein horizontal press 22 applies pressure from a horizontal direction, as opposed to a vertical direction as depicted in FIG. 1. In an alternative embodiment, pressure could be applied from both (or other) directions. In FIG. 6, the heater rods 4 are attached to separate electrical leads 20, which electrical leads are attached to an electrical current controller 24, which is attached in turn to a computer 26.

In FIG. 6, only one level of heater rods is shown attached to electrical current controller 24, but all heater rods may be so connected as desired. By use of individually controlled heater rods, it is possible to apply differential temperatures to different portions of the honeycomb core during curing. It is also possible to use heater rods 4 made of appropriate materials, such as materials having varying resistance from one end of the heater rod to the other, to controllably vary the heat from one end of the heater rod to the other end. By the use of such measures, it is possible to produce honeycomb core having differential sheer strength, having a tendency to bend or having other desired properties.

Figure 7:
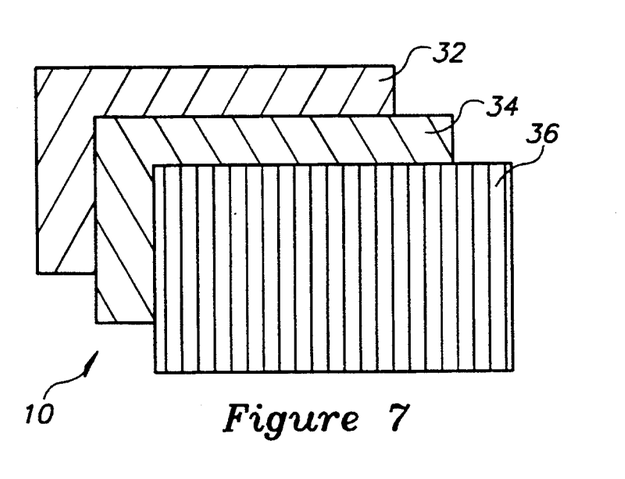
FIG. 7 depicts three sheets of different formable materials arranged such that the warp, woof or fiber direction varies.

FIG. 7 depicts an embodiment of the present invention wherein a single layer 10 comprises three sheets of different types of formable materials. In the embodiment depicted, a first sheet 32 of a first selected formable material has its warp, woof or fiber direction oriented in a first direction, while a second sheet 34 of a second selected formable material has its warp, woof or fiber direction oriented in a second direction, while a third sheet 36 of a third selected formable material has its warp, woof or fiber direction oriented in still a third direction. By orienting the sheets in such a manner, it is possible to produce layers of extremely high strength, flexibility and other properties as may be desired.

The formable materials may also be selected such that a sheet of formable material with a lesser shrinkage rate is consistently placed adjacent a first side of a second sheet of formable material having a greater shrinkage rate. By use of such a choice of formable materials, the layers in the honeycomb core will have a tendency to bend toward the side of greater shrinkage. A honeycomb core produced by such a method will have a predetermined, predesignated bend. Such bending may also be introduced by arranging the compressible array to have a bend, or by selecting appropriate cross-sectionally shaped heater rods.

The heater rods may be tapered from one end to the other. Using such an array, when the narrower ends are all pointing in the same direction, it is possible to form a honeycomb core having a radius. Other cross-sectional shapes will provide other advantages, including varying mechanical properties, to the honeycomb core.

Figure 8:
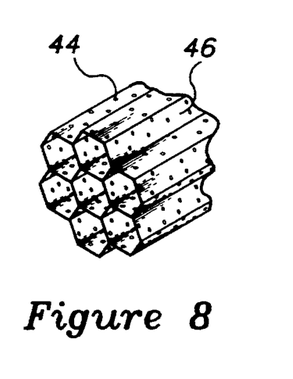
FIG. 8 depicts a perspective view of a perforated honeycomb core.

FIG. 8 depicts an embodiment of the present invention comprising a perforated honeycomb core. Perforations 44 in the cell walls 46 of the honeycomb core provide for a lighter core. Further the perforations can be placed or selected to provide for a gas, air, or a liquid to traverse the breadth of the honeycomb core. Accordingly, a honeycomb core permeable to air or water may be produced. By selection of charged or otherwise treated materials, the core may be made semi-permeable, or selectively permeable, and may also be used to separate desired materials from non-desired materials.

FIG. 9 depicts a portion of an array of heater rods 4 comprising a meltable rod material, wherein the heater rods have projections 48 on their outer surface. Upon compression of the array, the projections pierce, and thereby perforate, one or more layers of formable material interleaved between the heater rods. By the use of such heater rods, a perforated honeycomb core is created.

The present embodiments of this invention are to be considered in all respects as illustrative and not restrictive, the scope of the invention being indicated by the appended claims, and all changes which come within the meaning and range of equivalency of the claims therefor are intended to be embraced therein.

What is claimed is:

1. An apparatus for forming a honeycomb core comprising a compressible array comprising three or more levels of heater rods, wherein said heater rods are connected to a controlled heat source and are able to controllably generate and transmit heat and pressure to two or more layers of formable material interleaves between said heater rods and wherein a non-meltable rod material comprises substantially all of each of said heater rods with each of said heater rods including a surface layer of a meltable rod material having a melting point higher than the forming point of said formable material and lower than the melting point of said formable material.

2. The apparatus of claim 1 wherein one or more of said layers is a pressure-activated layer and said heater rods are able to controllably transmit sufficient pressure to cause said one or more pressure-activated layers to bind to an adjacent layer.

3. The apparatus of claim 1 wherein said pressure is supplied by a press.

4. The apparatus of claim 1 wherein said heater rods have a hexagonal cross section.

5. The apparatus of claim 1 wherein the outer surface of said heater rods comprises numerous projections capable of perforating at least one sheet in a layer of said formable material.

6. The apparatus of claim 1 wherein all of said heater rods are each permanently connected at one end to one or both of a heat or pressure supply.

7. The apparatus of claim 1 wherein said apparatus is able to control temperature transmitted to said layers of material within 5° F. of a desired temperature.

8. The apparatus of claim 7 wherein said temperature is controlled to within 0.5° F.

9. The apparatus of claim 1 wherein transmission of said heat and pressure is controlled by a computer.

* * * * *

UNITED STATES PATENT AND TRADEMARK OFFICE
CERTIFICATE OF CORRECTION

PATENT NO. : 5,354,394

DATED : October 11, 1994

INVENTOR(S) : H. Freeman Seebo and Robert E. Holeton

It is certified that error appears in the above-identified patent and that said Letters Patent is hereby corrected as shown below:

In column 10, claim 1, line 24, please delete "interleaves" and substitute therefor --interleaved--.

In column 10, claim 7, line 50, after "F", please delete ".".

Signed and Sealed this

Twenty-seventh Day of December, 1994

Attest:

BRUCE LEHMAN

*Attesting Officer*     *Commissioner of Patents and Trademarks*